United States Patent [19]

Mattes

[11] Patent Number: 4,481,790
[45] Date of Patent: Nov. 13, 1984

[54] COOLING SYSTEM

[75] Inventor: Dieter Mattes, Freiburg, Fed. Rep. of Germany

[73] Assignee: Sulzer Brothers, Ltd., Winterthur, Switzerland

[21] Appl. No.: 493,223

[22] Filed: May 10, 1983

[30] Foreign Application Priority Data

May 19, 1982 [CH] Switzerland .................... 823125

[51] Int. Cl.³ ............................................. F25B 27/02
[52] U.S. Cl. ....................................... 62/238.6; 62/305
[58] Field of Search .................... 62/238.6, 506, 305, 62/79, 159; 237/2 B; 165/DIG. 1

[56] References Cited

U.S. PATENT DOCUMENTS

| 3,490,517 | 1/1970 | Meckler | 62/305 |
| 3,523,575 | 8/1970 | Olivieri | 62/238.6 |
| 3,636,721 | 1/1972 | Rex | 62/159 X |
| 4,364,239 | 12/1982 | Chapelle et al. | 62/238.6 X |
| 4,399,664 | 8/1983 | Derosier | 62/238.6 X |
| 4,406,138 | 9/1983 | Nelson | 62/305 |

Primary Examiner—Lloyd L. King
Attorney, Agent, or Firm—Kenyon & Kenyon

[57] ABSTRACT

The cooling system employs a refrigeration machine having two condensers and an evaporator. The evaporator is connected in heat exchange relation with a low-temperature cooling circuit having a water accumulator. A cooling tower circuit for a higher temperature is connected with one condenser in order to cool a second load unit at a higher temperature than the first load unit.

The cooling tower circuit may also be employed to cool both load units when the outside ambient temperature is below a certain value.

The water accumulator may also be used as a heat source while the refrigeration machine is used as a heat pump in order to supply heat to a building heating system, for example during non-cooling periods.

11 Claims, 1 Drawing Figure

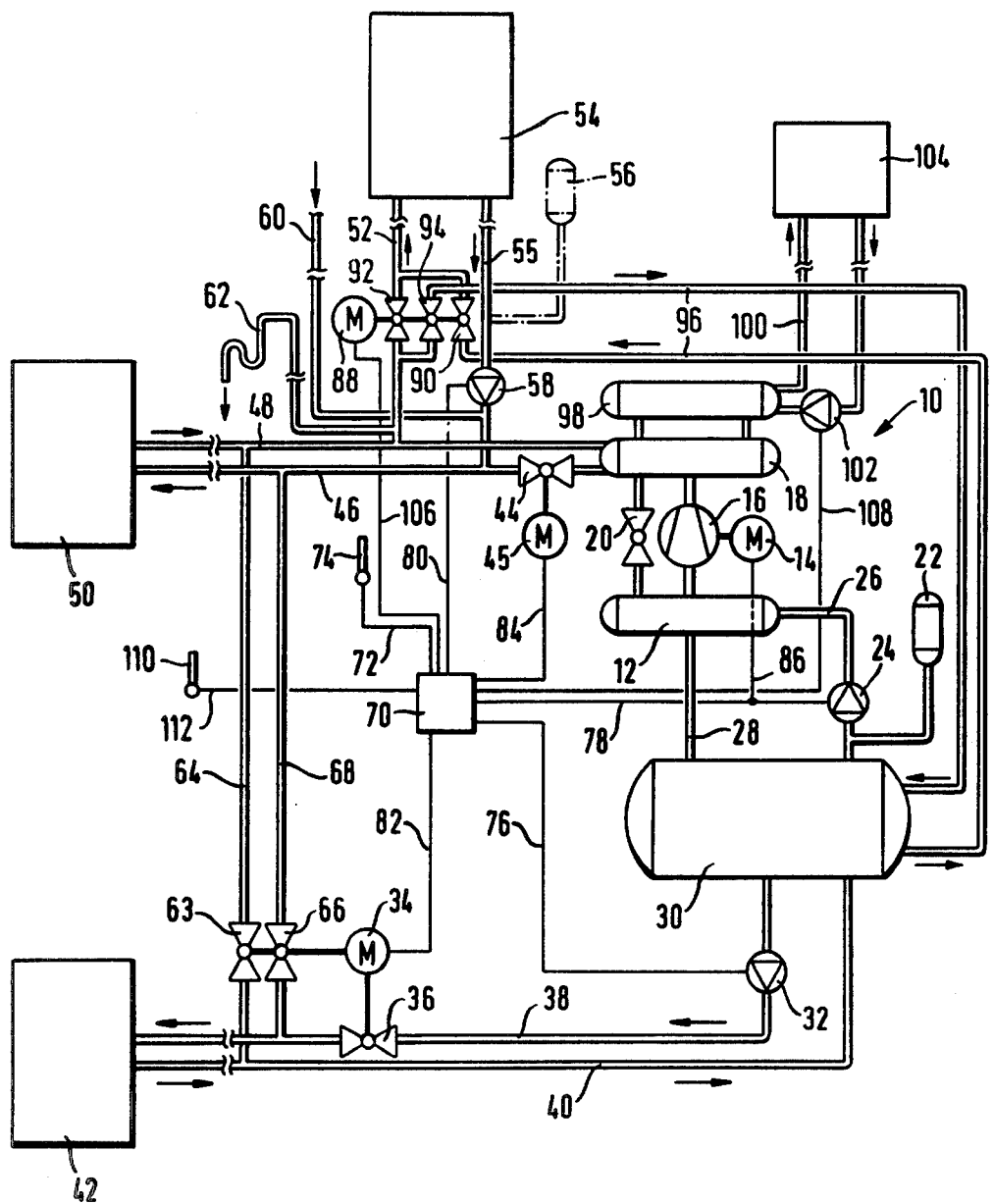

COOLING SYSTEM

This invention relates to a cooling system. More particularly, this invention relates to a cooling system with waste heat utilization. Still more particularly, this invention relates to a cooling system for cooling the cooling rolls, ink spreaders and oil coolers of rotary pressers.

Heretofore, various types of cooling systems have been known for cooling load units such as the cooling rolls, ink spreaders and oil coolers of rotary presses. Conventionally, cooling has been provided by using fresh water at a temperature of approximately 12° C. or by using water which has been cooled to this temperature, for instance, by a refrigerator. In all cases, all that is available for all the load groups and units is cooling water at one temperature. Waste heat is lost to the environment throughout the year. As a result, cooling in this fashion is relatively expensive.

Accordingly, it is an object of the invention to provide a cooling system which is able to provide a relatively inexpensive cooling effect.

It is another object of the invention to provide a cooling system in which waste heat can be economically employed.

Briefly, the invention provides a cooling system for at least two load units. This system includes a refrigeration machine having a condenser and an evaporator, a low-temperature cooling circuit which is disposed in heat exchange relation with the evaporator for circulating a flow of water at a first temperature to one of the load units, and a cooling tower circuit for circulating a flow of water at a higher temperature to the other load unit.

The low-temperature cooling circuit is also provided with a water accumulator in which water can be stored for use.

The cooling tower circuit is selectively connected to the refrigeration machine and to the load unit to which the low-temperature cooling circuit is connected so that, at an appropriate outside temperature, total cooling can be provided by the cooling tower circuit to both load units. At this time, the low-temperature cooling circuit and the refrigeration machine can be shut-off.

In addition, the cooling system may be connected to a heating system such as a building heating system in order to utilize the waste heat of the system. To this end, the refrigeration machine is provided with a second condenser which is selectively connected to the heating system in heat exchange relation for delivering heat thereto. In addition, the water accumulator of the low-temperature cooling circuit is connected to the cooling tower circuit, for example to a return line, in order to extract heat from the cooling tower circuit for subsequent use in the building heating system.

During a normal operation, the cooling system may be employed so that the low-temperature cooling circuit cools one load unit to a temperature of for example 12° C. while the cooling tower circuit cools the other load unit to a higher temperature, for example 27° C.

One advantage of the cooling system is that only a relatively small proportion i.e. approximately from 10% to 20%, of the energy (cold) demand is used for cooling the water mechanically to approximately 12° C. in the low-temperature cooling circuit. By far, the larger proportion of the cold demand can be covered by cooling water from a cooling tower circuit at a temperature of up to approximately 27° C. As a result, the refrigeration machine output can be reduced by from 80% to 90% as compared with previously known systems. A correspondingly reduced expenditure for machinery and driving power would also result.

Advantageously, the cooling condenser of the refrigeration machine is disposed in heat exchange relation with the cooling tower circuit. This provides a simple way of eliminating the waste heat of the refrigeration during a non-heating operation.

In the case where the waste heat is used for the building heating system, the water accumulator can be used as a heat source. For example, at an appropriate ambient temperature and room temperature, the heat which is accumulated in the water accumulator can be transferred to the refrigeration machine while the second condenser of the refrigeration machine acts as a heating condenser to deliver this heat to the building heating system. In this case, the refrigeration machine acts as a heat pump and serves to relieve the load which has to be provided by the building heating system.

Of note, the water accumulator is charged-up with heat from the cooling tower circuit during operation of the refrigeration machine as a heat pump and the accumulator as a heat source.

These and other objects and advantages of the invention will become more apparent from the following detailed description taken in conjunction with the accompanying drawings wherein:

The drawing schematically illustrates a cooling system for two load units and a building heating system in accordance with the invention.

Referring to the drawing, the cooling system includes a refrigeration machine 10 which has an evaporator 12, a compressor 16 driven by a motor 14, a condenser 18, a heating condenser 98 and a restrictor valve 20 which are interconnected to form a refrigeration circuit for conveying a suitable refrigerant therethrough.

The cooling system also has a low-temperature cooling circuit disposed in heat exchange relation with the refrigeration machine 10. This low-temperature cooling circuit includes a water accumulator 30, a pair of lines 26, 28 which communicate the water accumulator 30 with the evaporator 12 to convey water therethrough and a pump 24 which is disposed in the supply line 26 to the evaporator 12. In addition, the low-temperature cooling circuit has a pair of lines 38, 40 which communicate the water accumulator 30 with a load unit 42 for delivering cooling water thereto. As shown, the supply line 38 has a pump 32 and a valve 36 which is operated by a servomotor 34 disposed therein for controlling the flow of cooling water to the load unit 42. An expansion vessel 22 is also connected via a branch line to the supply line 24 leading from the accumulator 30 to the evaporator 12 upstream of the pump 24.

The load unit 42 may be comprised, for example by cooling rolls of a rotary press.

The condenser 18 of the refrigeration machine 10 is connected to a second load unit 50 via a pair of lines 46, 48 in order to deliver a flow of cooling water thereto. As indicated, the supply line 46 has a valve 44 therein which is controlled via a servo-motor 45.

The second load unit 50 may include oil coolers, inking devices and cooling rolls of a rotary press.

The cooling system also has a cooling tower circuit for delivering cooling water to the load unit 50. As indicated the tower cooling circuit includes a closed cooling tower 54 which is connected via respective lines 55, 52 to the supply line 46 and return line 48 of the load unit 50. As indicated, the supply line 55 has a pump 58 therein while the return line 52 has a valve 92 therein which is controlled by a servomotor 88. In addition, an expansion vessel 56 is connected to the supply line 55 upstream of the pump 58.

The cooling tower circuit is connected to a town water connection 60 so as to receive a supply of water and to a corresponding discharge 62. As shown, the connection 60 is made to the supply line 55 downstream of the pump 58 while the discharge 62 is connected to the return line 52 upsteam of the valve 92.

The lines 46, 48 to the load unit 50 are also connected via lines 68, 64, respectively to the lines 38, 40 to the load unit 42. In addition, valves 63, 66 are disposed in the respective lines 64, 68 and are controlled via a servomotor 34.

Of note, if the cooling tower 54 is open, the expansion vessel 56 can be omitted.

As shown, the water accumulator 30 communicates with the cooling tower return line 52 via a circuit 96 having valves 90, 94 therein. These valves 90, 94 are also controlled by the servomotor 88. As indicated, the valve 92 is disposed between the connection points of the circuit 96 to the return line 52. In addition, a circuit 100 is connected to the heating condenser 98 of the refrigeration machine 10 to deliver heated water to a heating system 104 such as the heating system for the building in which the load units 42, 50 are housed. As shown, the return line of the circuit 100 has a pump 102 disposed therein for controlling the flow.

The cooling system is controlled by means of a controller 70. As shown, this controller 70 has signal lines 72, 112 which connect to an ambient temperature probe 74 and a room temperature probe 110, respectively. In addition, the controller 70 has signal lines 76, 78, 80, 108 which connect the controller 70 to the pumps 32, 24, 58, 102. Other signal lines 82, 84, 106 connect the controler 70 to the servomotors 34, 45, 88, respectively. A branch of signal line 86 also extends from the signal line 78 to the compressor motor 14.

As a first example of how the cooling system operates, the load unit 42 is assumed to be operating at a temperature of approximately 12° C. while the load unit 50 operates at a temperature of approximately 27° C. In addition, the ambient temperature is assumed at approximately 30° C. In this case, the valves 36, 44, 92, are open and the valves 63, 66, 90, 94 are closed. In addition, the motor 14 and the pumps 24, 32, 58 are operating.

At this time, the refrigeration machine 10 charges the accumulator 30. Thus, cooling water at a temperature of approximately 12° C. circulates between the accumulator 30 and the load unit 42 via the pump 32 and lines 38, 40. At the same time, cooling water at a temperature of approximately 27° C. circulates via the pump 58 of the cooling tower circuit between the cooling tower 54 and the load unit 50.

Of note, the water circulating through the cooling tower 54 passes from the supply line 55 into both the condenser 18 of the refrigeration machine 10 and the load unit 50 to extract heat. In this way, the heat which is transferred from the water accumulator 30 to the refrigeration machine 10 is extracted for use in the cooling tower circuit.

Assuming that the ambient temperature detected by the temperature probe 74 is below approximately 6° C., the low-temperature circuit can be cut-out by stopping the compressor motor 14 and the pumps 24, 32. At the same time, the servomotor 34 is actuated to close the valve 36 while opening the valve 63, 66. Likewise, the motor 45 is actuated to close the valve 44 while the pump 58 remains in operation. At this time, the cooling tower circuit cools both load units 42, 50 by supplying cooling water to each. That is, cooling water is circulated through the load unit 42 via the lines 46, 68, 38 and 40, 64, 48 while water is circulated via the lines 46, 48 to the load unit 50.

As a third example of how the system operates with waste heat utilization, the conditions and procedures for the second example are assumed to exist. However, it is further assumed that the room temperature probe 110 detects a temperature below 15° C. In this case, the motor 14 and pump 24 remain in operation and the pump 102 responsible for circulating heating water through the condenser 98 starts. At the same time, the motor 88 is actuated to close the valve 92 while opening the valves 90, 94 so that the accumulator 30 is connected to the cooling tower return line 52. The refrigerator 10 now operates as a heat pump and discharges the accumulator 30.

Of note, during operation of the refrigeration machine 10 as a heat pump, the water accumulator 30 serves as a heat source. That is, the circuit 96 serves to convey heated water from the cooling tower circuit return line 52 to the water accumulator 30. This heat is transferred to the refrigeration machine 10 via the evaporator 12 and, in turn, is conveyed to the circuit 100 for the heating system 104.

If the ambient temperature is appropriate, at room temperature as above approximately 15° C., the cooling tower circuit may also be used to charge up the accumulator 30.

Further, if the room temperature is appropriate, heat can be removed from the accumulator 30 while the heat pump is in operation outside of the normal cooling periods, i.e. during the night and during weekends, and yielded to the heating circuit for the heating system 104.

The invention thus provides a cooling system which is able to employ waste heat in an efficient and economic manner. Further, the invention provides a cooling system which can be used for cooling the various components of rotary presses in an efficient manner with a reduction in the cost of energy.

What is claimed is:

1. A cooling system for at least two load units, said system comprising
    a refrigeration machine having a first condenser for normal operation, a second condenser for heat pump operation an evaporator and a compressor for circulating a refrigerant through said condensors and said evaporator;
    a low-temperature cooling circuit disposed in heat exchange relation with said evaporator for circulating a flow of water at a first temperature to one of the load units and having a cooling water accumulator therein; and
    a cooling tower circuit for circulating a flow of water at a higher temperature than said first temperature to at least one of the load units whereby below a given ambient temperature said cooling tower circuit circulates water to the other of the load units and above said ambient temperature said cooling tower circuit circulates water to both load units.

2. A cooling system as set forth in claim 1 wherein said first condenser is disposed in heat exchange relation with said cooling tower circuit.

3. A cooling system as set forth in claim 1 wherein said accumulator is selectively connected to said cooling tower circuit for charging of said accumulator.

4. A cooling system as set forth in claim 1 wherein said accumulator is connected to said cooling tower circuit to receive a heated flow of water therefrom and said refrigeration machine is connected to said accumulator to receive a heated flow of water therefrom for conveying heat to a heating system as a heat pump.

5. A cooling system for at least two load units, said system comprising
   a refrigeration machine having an evaporator, a compressor and a first condenser connected in a refrigeration circuit for conveying a refrigerant therethrough;
   a low-temperature cooling circuit for conveying a flow of cooling water through a first load unit, said cooling circuit being disposed in heat exchange relation with said refrigeration circuit to deliver heat to said refrigeration circuit and having a water accumulator therein; and
   a cooling tower circuit for conveying a second flow of cooling water through a second load unit, said cooling tower circuit being selectively connected in heat exchange relation with said refrigeration circuit.

6. A cooling system as set forth in claim 5 wherein said evaporator is connected in heat exchange reltion with said low-temperature cooling circuit to extract heat therefrom and said condenser is selectively connected in heat exchange relation with said cooling tower circuit to deliver heat thereto.

7. A cooling system as set forth in claim 5 wherein said cooling tower circuit is selectively connected in common to the first and second load units to extract heat therefrom.

8. A cooling system as set forth in claim 6 wherein said refrigeration machine further includes a second condenser in said refrigeration circuit selectively connected to a heating system for delivering heat thereto, and said accumulator is connected to said cooling tower circuit to extract heat therefrom.

9. In combination,
   a first load unit having heat generated therein;
   a second load unit having heat generated therein;
   a refrigeration machine having an evaporator and a first condenser in a refrigeration circuit;
   a low-temperature cooling circuit having a water accumulator therein, said cooling circuit being selectively connected between said refrigerator and said first load unit to cool said first load unit to a first temperature; and
   a cooling tower circuit selectively connected to said refrigerator and said second load unit to extract heat from said refrigerator and to cool said second load unit to a second temperature higher than said first temperature.

10. The combination as set forth in claim 9 which further comprises a valve for disconnecting said cooling tower circuit from said refrigeration machine and valves for connecting said cooling tower circuit to said first load to cool said first load.

11. The combination as set forth in claim 10 which further comprises a heating system and wherein said refrigeration machine further includes a second condenser in said refrigeration circuit connected to said heating system to deliver heat thereto, and wherein said accumulator is connected to said cooling tower circuit to receive heat therefrom.

* * * * *